United States Patent [19]

Philp et al.

[11] 3,898,185

[45] Aug. 5, 1975

[54] SHELF-STABLE ELECTROCONDUCTIVE LATEX COMPOSITION

[75] Inventors: Dennis H. Philp, Midland; Wendell N. Delano, Freeland, both of Mich.

[73] Assignee: The Dow Chemical Company, Midland, Mich.

[22] Filed: Aug. 10, 1973

[21] Appl. No.: 387,412

[52] U.S. Cl. ................. 252/511; 252/521; 260/2 A
[51] Int. Cl. ........................... H01b 1/06; H01b 1/04
[58] Field of Search .......... 252/511, 510, 518, 521; 260/2 A

[56] References Cited
UNITED STATES PATENTS

| | | | |
|---|---|---|---|
| 3,013,997 | 12/1961 | Coler et al. | 260/23 |
| 3,035,955 | 5/1962 | Zucker et al. | 252/511 X |
| 3,205,187 | 9/1965 | Vanderhoff | 260/89.7 N |
| 3,406,126 | 10/1968 | Litant | 252/511 |
| 3,625,684 | 12/1971 | Poot et al. | 260/2 A |
| 3,640,766 | 2/1972 | Jursich et al. | 260/2 A |
| 3,757,088 | 9/1973 | Osborn | 252/511 X |

*Primary Examiner*—Maynard R. Wilbur
*Assistant Examiner*—G. E. Montone
*Attorney, Agent, or Firm*—Richard G. Waterman; Michael S. Jenkins

[57] ABSTRACT

A shelf-stable, electroconductive latex is provided by adding low molecular weight, quaternized polyepichlorohydrin to an anionically stabilized latex. The resulting electroconductive latex is particularly useful as a textile backing composition.

10 Claims, No Drawings

SHELF-STABLE ELECTROCONDUCTIVE LATEX COMPOSITION

BACKGROUND OF THE INVENTION

This invention relates to electroconductive latexes prepared from anionically stabilized latexes, i.e., aqueous colloidal dispersions of solid addition polymers wherein the dispersed particles are stabilized by anionic means.

In general, textiles, particularly those made from hydrophobic synthetic resins, characteristically accumulate static charges. As a result of the formation of these static charges, many of these synthetic resins have been found somewhat unsatisfactory for certain purposes, e.g., use in the manufactue of rugs, carpets, seat covers and the like. In order to dissipate the accumulated static charges, it has been the practice in the art to coat the textile fibers with an electroconductive material, e.g., polyalkylene polyamines. More recently, especially in the manufacture of carpets and the like, metallic fibers have been interwoven with synthetic fiber in order to provide means for dissipating accumulated static electricity. Both of the foregoing techniques are relatively successful in dissipating the charge from the carpet fibers.

The application of latexes, natural and synthetic, to rugs, carpets and other textile materials as backing materials, binders, etc. has grown very rapidly in recent years. Such growth is particularly noticeable in the manufacture of carpets since the development of tufted carpets. In such instances, latexes applied to the back of the rug or carpet prove to be a practical means for locking the tufts in place and strengthing the floor covering. The latexes also serve as an effective adhesive for binding the textile fiber to woven or non-woven materials, often called scrim.

Typically, anionically stabilized latexes are employed in these applications because of ease of preparation and ease of handling. Normally in the preparation of anionically stabilized latexes, a selected monomer or group of monomers is subjected to emulsion polymerization conditions in aqueous media containing anionic emulsifiers such as fatty acid salts, long-chain alkyl sulfates or sulfonates, alkyl aryl sulfonates and the like. A wide variety of polymers can be made in anionically stabilized latex form by this technique. Unfortuntely, anionically stabilized latexes are generally non-conductive and are therefore unable to dissipate electrostatic charge coming from some charged electroconductive material such as an electroconductive coated fiber or metallic fiber. Consequently, when the conductive material, e.g., electroconductive textile fiber, is contacted by a person, the charge accumulates on the conductive material and is not adequately dissipated in many carpets which do not provide an electrical ground for the conductive material. As a result of the carpet's inability to adequately dissipate charge, an equally high charge builds up on the person. When the person exposed to such charge touches an object capable of grounding or dissipating that charge, he receives an unpleasant shock.

Previous attempts to improve the electroconductivity of anionically stabilized latexes by the addition of cationically active materials to the latex have not proved entirely successful. Addition of the cationically active materials directly to the anionically stabilized latex usually fails because the dispersed polymer phase coagulates or precipitates upon addition of the cationic agent. See U.S. Pat. No. 3,205,187. Only rarely can the resulting precipitate or coagulum be effectively redispersed by further addition of cationic material. In the few instances when the latex is not coagulated by the addition of the cationic agent such as a cationic polyelectrolyte or cationic organic polymers, the latex undergoes appreciable ionic destabilization. This ionic destabilization is due in many instances to the incompatibility between the cationic material and the latex polymer which is anionic in nature. Attempts to improve compatibility by the use of cationic soaps have usually resulted in a viscous paste which does not adhere well to the textile and which do not wear well under continued stress. As a further disadvantage, latex compositions containing only cationic organic polymers or polyelectrolytes often possess objectionable odors and poor color.

In view of the disadvantages of preparing electroconductive latexes by prior art means, it would be highly desirable to provide an efficient electroconductive material suitable for employment as textile backing material.

SUMMARY OF THE INVENTION

In accordance with the present invention, there is provided an improvement in a latex composition suitable as a backing material for textiles wherein the composition comprises an anionically stabilized latex containing a filler and a thickener for the latex. The improvement comprises a shelf-stable form of the composition containing a quaternized epihalohydrin polymer having a molecular weight in the range from about 120 to about 200,000 and a degree of quaternization in the range from about 40 to 100 mole percent. The quaternized polymer is present in the composition in amount sufficient to measurably reduce the volume resistivity of the composition.

In addition to having excellent electroconductive properties, the electroconductive latex compositions of this invention are shelf-stable for a substantial period of time, e.g., for at least 8 hours, and have Brookfield viscosities below 18,000 centipoise (cps) at room temperature using a No. 5 spindle at 20 revolutions per minute (rpm). In this regard, these novel latex compositions differ significantly from previous latex compositions containing cationic organic polymers. Moreover, the electroconductive latex of the instant invention adheres well to substantially all textiles, wears well under continued stress and is essentially odor free. In a particularly useful embodiment, the electroconductive latex composition is employed in scrim backed textile articles to bond the scrim to the textile fabric.

In addition to their primary utility as textile backing materials, the electroconductive latex compositions of the present invention are useful for coating and impregnating paper, textiles and other substrates including those of wood and plastic.

DETAILED DESCRIPTION OF THE PREFERRED EMBODIMENTS

By "anionically stabilized latex" is meant an anionically stabilized aqueous colloidal dispersion of a solid thermoplastic organic addition polymer wherein the polymer particles possess a negative charge, demonstratable electrophoretically as being attracted to the anode of an electrolytic cell, whether such charge be generated by action of a polymerizable anionic monomer constituent, an absorbed anionic emulsifier, a reactive catalyst, or otherwise, including any combination thereof. Kinds of polymerizable unsaturated monomers, aqueous polymerization media, catalysts, emulsifiers, procedures and means for making anionically stabilized latexes are well known in the art and reference is made thereto for the purposes of the present invention. Merely for purposes of illustration and not for limitation, reference is made to the art-accepted treatise, "Polymer Processes", edited by Calvin E. Schildknecht, published (1956) by Interscience Publishers, Incorporated, New York, Chapter IV. "Polymerizations in Emulsion", by H. Leverne Williams. There is set forth in Table II of that publication diverse kinds of monomers which can be polymerized alone (homopolymers) or in mixtures (copolymers). Diverse anionic emulsifiers, catalysts and catalyst activators, chain transfer agents, and procedural steps are also set forth in the cited book and other published art. Reference is also made to "Emulsion Polymerization", by F. A. Bovey et al., published (1955) by Interscience Publishers, Incorporated, New York.

Of particular interest in this invention are the latexes of vinylaromatic polymers such as the polymers of styrene; substituted styrenes, e.g., ar-bromo- and ar-chlorostyrenes, α-methylstyrene, ar-t-butylstyrene, vinylnaphthalene, and other monovinylidene carbocyclic aromatic monomers. The term "vinylaromatic polymers" includes homopolymers and copolymers thereof with other ethylenically unsaturated monomers copolymerizable therewith, particularly the conjugated dienes such as butadiene and isoprene. Of special interest are the latexes of styrene/butadiene copolymers having up to 5 weight percent based on copolymer of ethylenically unsaturated carboxylic acids copolymerized therewith, e.g., acrylic acid, itaconic acid, maleic acid and methacrylic acid.

The quaternized epihalohydrin polymer employed herein has the formula:

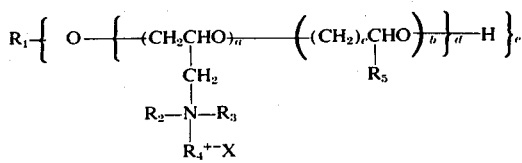

wherein $R_1$ is hydrogen or the residue of an active hydrogen organic initiator, $R_2$, $R_3$, and $R_4$ are individually alkyl having 1 to 2 carbon atoms and $(C_nH_{2n}O)_yH$ where $y$ is 1 and $n$ is an integer from 1 to 3, $R_5$ is hydrogen, alkyl, haloalkyl or aminoalkyl, $a$ is an integer from 1 to 2000, $b$ is an integer from 0 to 1000, $c$ is an integer from 1 to 4, $d$ is an integer from 1 to 2000, and $e$ is an integer from 1 to 8 and X is an anion, preferably a halogen such as chlorine, bromine and iodine. Preferably, X is chlorine, $R_1$ is hydrogen, $R_2$, $R_3$, and $R_4$ are methyl, $R_5$ is hydrogen or halomethyl, $a$ is 1 to 20, $b$ is 0 to 10, $c$ is 1 to 2, $d$ is 1 to 5 and $e$ is 1 or 2.

Exemplary $R_1$ are hydrogen and the residues of aliphatic monohydric and polyhydric alcohols such as methanol, ethanol, 2-butanol, 1-octanol, ethylene glycol, propylene glycol, and 1,3-butane diol and glycerol; alcohol ethers such as ethylene glycol monomethyl ether; hydroxy terminated polyethers such as the polyethylene glycols and polypropylene glycols; monohydric and polyhydric phenols such as phenol, resorcinol and hydroquinone and the like. In the instance wherein $R_1$ is a residue of an active hydrogen initiator, $R_1$ is bonded to

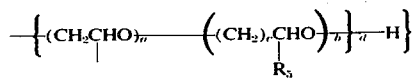

by $-\overset{|}{\underset{|*}{C}}-O-$ wherein $-\overset{|}{\underset{|*}{C}}-$ is part of $R_1$.

Exemplary $R_2$, $R_3$, and $R_4$ are methyl, ethyl, and hydroxyethyl. Exemplary $R_5$ are hydrogen, methyl, ethyl, propyl and butyl, halomethyl, haloethyl and the like.

These quaternized epihalohydrin polymers can be easily prepared by reacting epihalohydrin polymer with trialkylamine or tri(hydroxyalkyl)amine. For purposes of this invention, epihalohydrin polymers include both homopolymers and copolymers of epihalohydrin. Suitably the polymer is quaternized to the extent that the polymer contains from about 50 to 100 mole percent of quaternary adducts, preferably from about 80 to 100 mole percent of quaternary adducts. A 100 mole percent substitution of quaternary adducts means that all of the repeating monomer units of the epihalohydrin polymer carry a quaternary adduct. Partially quaternized epihalohydrin polymers have been tested and have been found that when the amount of quaternization is below 50 mole percent the electroconductivity of the anionically stabilized latex is not sufficient to comply with industry standards for an electroconductive latex.

To produce the quaternized epihalohydrin polymers of desired molecular weight, namely those having a molecular weight in the range from about 120 to about 200,000, and preferably from about 120 to about 2,000 it is first necessary to choose an appropriate molecular weight of epihalohydrin polymer. Polyepihalohydrin having molecular weight in the range from about 90 to about 160,000, preferably from about 90 to about 1,600, are found to be useful in the present invention. The amine used to quaternize the epihalohydrin polymer is preferably trimethylamine. However, other amines such as triethylamine, methyldiethylamine, hydroxyethyldiethylamine, as well as mixtures of such amines are found to be suitable in the practice of the present invention.

The quaternized epihalohydrin polymer is advantageously prepared by reacting epihalohydrin polymer in the presence of small quantities of water with the desired tertiary amine. Beneficially, the reaction is carried out under a nitrogen atmosphere at temperatures in the range from about 50° to about 120°C. A suitable method for preparation of the quaternized polymer is more specifically described in U.S. Pat. No. 3,320,317 to Rogers et al.

In preferred embodiments, the invention is practiced by adding the quaternized epihalohydrin polymer, advantageously in the form of an aqueous solution containing from about 40 to about 60 weight percent of the quaternized polymer, to the latex. The quaternized polymer can be added before or after filler, e.g., calcium carbonate, has been dispersed in the latex. The quaternized polymer should be added to the latex formulation prior to the addition of thickeners, e.g., conventional thickeners for anionically stabilized latexes such as sodium polyacrylate. During the addition of the quaternized polymer to the latex or latex/filler formulation, it is desirable to agitate the latex or latex/filler formulation vigorously. The concentration of the quaternized polymer in the aqueous solution, the percent solids of the anionically stabilized latex and the concentration of the filler are not critical and therefore may vary as in conventional formulations.

One advantage of this invention over processes of the prior art is that mixing of the quaternized polyepihalohydrin, the latex and filler can be accomplished without significant increase in viscosity of the resulting composition. Mixing of the foregoing materials can be readily accomplished with conventional mixing apparatus such as stirrers, pumps, homogenizers and the like. The temperature of the mixing is not critical and is conveniently at or near room temperature.

Beneficially, the amount of quaternized polyepihalohydrin combined with the anionically stabilized latex is in the range from about 2 to about 50 parts (dry) by weight per 100 parts (dry) of latex polymer, preferably from about 4 to about 13 parts by weight. It is understood, however, that the degree of quaternization of the polyepichlorohydrin will affect the preferred amount of polyepichlorohydrin to be employed. For example, polyepichlorohydrin quaternized to 100 mole percent can be employed in lower amounts than polyepichlorohydrin quaternized to only 50 mole percent.

In instances wherein the quaternized epihalohydrin polymer has a molecular weight from about 120 to about 2,000, no special precautions need be taken in combining the polymer with the latex in order to prepare a composition which is shelf-stable for a period of 3 days, preferably at least 7 days. In such instances, the polymer and latex can be combined in any order and other ingredients, such as fillers and the like can be added before or after combination of latex and the quaternized epihalohydrin polymer. However, if the molecular weight of the quaternized epihalohydrin polymer is in the range from about 2,000 to about 200,000, it is preferably in order to prepare such a shelf-stable composition to add a water-soluble monovalent inorganic salt such as an alkali metal halide or an organic salt such as alkali metal or ammonium carboxylate to the latex or quaternized polymer prior to combination of the latex with the quaternized epihalohydrin polymer. In addition, in such cases, the filler should be added only after the salt is added to the composition. When used, the inorganic or organic salt is added in amounts in the range from about 0.5 to about 20 dry weight parts based on 100 dry weight parts latex polymer solids, preferably from about 0.5 to about 8 dry weight parts. When salt is to be added, it is desirable to add relatively small amounts of a non-ionic surfactant to the latex prior to combination of the latex with the quaternized polymer. Preferably such surfactant is added in amounts in the range from about 0.1 to about 1 dry weight part per 100 dry weight parts of latex polymer solids.

Suitable inorganic salts include the alkali metal halides such as sodium chloride, potassium chloride, sodium bromide, potassium iodide and the like.

Suitable organic salts include ammonium oxalate, ammonium acetate, sodium acetate and potassium acetate.

Suitable nonionic surfactants include nonylphenoxypoly(ethyleneoxy)ethanol, the ethylene glycol polyethers, the fatty acid esters of polyhydric alcohols and others set forth in Becher, Emulsions: Theory and Practice, 2nd Ed., Reinhold Publishing Corp., New York, 221–225 (1965).

In the normal practice of the present invention, the latex composition, advantageously to be used as a carpeting backing, contains a conventional amount of a filler such as calcium carbonate, clay, titanium dioxide, and the like, preferably calcium carbonate. Generally, conventional amounts of filler range from about 100 to about 450 dry weight parts based on 100 dry weight parts of latex.

Following addition of the aforementioned ingredients to the latex composition, it is generally desirable to increase the viscosity of the composition to the value desired for the particular application by the addition of a conventional thickener such as sodium or potassium polyacrylate, sodium carboxymethyl cellulose, casein, and the like.

In addition to the aforementioned salts, fillers, thickeners and surfactants, other ingredients typically employed in latex formulations, thickeners, buffer agents, pH adjusting agents and the like, may also be added to the latex. Preferably such ingredients are added to the latex prior to combination of the latex with the quaternized polyepihalohydrin.

The resulting electroconductive latex composition can be easily applied as a layer to a substrate, cured and then dried by conventional means. In a preferred embodiment, the electroconductive latex composition containing on a dry basis from about 20 to about 35 weight percent of latex polymer solids and from about 62 to about 79 weight percent of filler such as calcium carbonate, from about 1 to about 3 weight percent of quaternized polyepichlorohydrin, and an amount of thickener effective to provide the desired viscosity, e.g., for carpet backing from about 6,000 to about 15,000 cps at ambient temperatures using a No. 5 spindle and 20 rpm, is applied as an aqueous dispersion having from about 50 to about 80 weight percent total solids to a fibrous substrate, e.g., carpeting material or other fabric and exposed to conditions of temperature, etc., sufficient to dry and cure the latex composition. The resulting substrate is found to significantly reduce the accumulation of static charge on hydrophobic textile materials. For example, substrates which exhibit improved electroconductivity when treated with the composition of this invention include the hydrophobic natural resins, for example, wool, cotton and the like, and synthetic resins, for example, nylon, polyester, polyolefin and polyacrylonitrile. Substrates particularly improved in this regard are fibers and filaments of synthetic resins and articles woven therefrom.

The following examples are given to illustrate more clearly the principle and the practice of this invention to those skilled in the art and are not for purposes of limitation. Throughout this specification and claims all parts and percentages are by weight unless otherwise indicated.

EXAMPLE 1

An aqueous solution of polyepichlorohydrin having the molecular weight of about 500 and quaternized with trimethylamine to a degree of 100 mole percent is added to an anionically stabilized latex containing calcium carbonate as filler to form the following carpet-backing formulation:

| Ingredients | Dry Weight | Wet Weight |
|---|---|---|
| Quaternized polyepichlorohydrin | 9.2 g | 18.4 g |
| Latex* | 100 g | 215 g |
| Calcium carbonate | 350 g | 350 g |
| Water | — | 76 g |

*an anionically stabilized aqueous dispersion of a styrene/butadiene copolymer.

The foregoing formulation has a Brookfield viscosity of about 100 cps at room temperature using a No. 5 spindle and 20 rpm. The viscosity of the formulation is increased to 10,000 cps by adding 11 grams of an aqueous solution (9.1% active) of a conventional sodium polyacrylate thickener.

This carpetbacking composition is cast onto a glass substrate in the form of a 0.02 inch wet layer, dried at ambient temperature and conditioned at 20% relative humidity for 16 hours. volume resistivities of this resulting dried residue composition as determined by ASTM D-257-61 is $8.6 \times 10^{10}$ ohm centimeters as compared to a volume resistivity of $3.2 \times 10^{15}$ ohm centimeters for a similarly dried film of the starting latex containing no quaternized polyepichlorohydrin.

A portion of this carpetbacking formulation is stored for a period of about 14 days at room temperature and is found to be completely dispersed with no coagulum formation at the end of this period.

Another portion of the carpetbacking formulation is applied at 30 ounces per square yard to the back side of a 27 inch × 36 inch piece of low level loop carpet made of nylon fiber. Jute is applied as backing after the latex has been applied. The resulting sample is cured at 275°F for a period of 12 minutes and is then conditioned for 72 hours at 20% relative humidity. The static voltage generated on the resulting carpet is about 1500 volts as determined by AATCC Test Method 134-69 (American Association of Textile Colonists and Chemists). This compares to a static voltge of ~6000 volts which is generated on a similar carpet which has been coated with a latex formulation similar to the preceding one except containing no quaternized polymer.

EXAMPLE 2

Following the procedure of Example 1, an aqueous solution of a quaternized polyepichlorohydrin having a molecular weight of 2,000 and quaternized with trimethylamine to a degree of 100 mole percent is added to a latex composition to provide the following formulation:

| Ingredients | Dry | Wet |
|---|---|---|
| Quaternized polyepichlorohydrin | 6.8 | 12.1 |
| Latex* | 100 | 215 |
| Calcium carbonate | 350 | 350 |
| Sodium chloride | 1.0 | 1.0 |
| Nonylphenoxypoly(ethyleneoxy)ethanol | 0.5 | 0.5 |
| Water | — | 76.3 |

*an anionically stabilized, aqueous dispersion of a styrene/butadiene copolymer.

The resulting formulation had a Brookfield viscosity of 4900 cps using a No. 5 spindle and 20 rpm. A 15-g. portion of an aqueous solution (9.1% active) of sodium polyacrylate thickener used in Example 1 is added to raise the viscosity of the foregoing formulation to 10,000 to 12,000 cps. The resulting thickened formulation exhibits complete stability after storage for seven days. For purposes of comparison, the foregoing quaternized polyepichlorohydrin in 57 percent aqueous solution is added to the latex composition containing calcium carbonate, water and sodium polyacrylate thickener, but no sodium chloride. The resulting formulation has a Brookfield viscosity greater than 20,000 cps using a No. 5 spindle and 20 rpm. This comparative latex coagulates after storage of one hour.

For the purposes of showing the effect of using different concentrations of sodium chloride in the foregoing formulation several formulations are prepared using salt concentrations ranging from 0.2 to 1 part of sodium chloride based on 100 dry parts of latex. The viscosities of the resulting formulations are determined using a No. 5 spindle and 20 rpm and the results are recorded in Table II.

TABLE II

| Sample No. | Sodium Chloride Concentration Wt. Pts. | Brookfield Viscosity cps |
|---|---|---|
| 1 | 0.2 | 19,000 |
| 2 | 0.4 | 14,000 |
| 3 | 0.6 | 12,000 |
| 4 | 0.8 | 8,000 |
| 5 | 1.0 | 5,000 |

Based on the foregoing results, the quantity of salt used to achieve the desired viscosity will depend on molecular weight, type of salt and the particular viscosity desired. Generally, a viscosity of 5000 cps or less is desired in order that sufficient thickener may be added to achieve complete stability. The foregoing compositions of this example which exemplify this invention have electroconductive properties similar to those of the composition of Example 1.

EXAMPLE 3

To an aqueous solution of polyepichlorohydrin having a molecular weight of about 2000 and quaternized with trimethylamine to a degree of 100 mole percent is added an anionically stabilized latex and calcium carbonate to form the following carpetbacking formulation:

| Ingredients | Dry Weight | Wet Weight |
|---|---|---|
| Quaternized polyepichlorohydrin | 50 g | 87.7 g |
| Latex* | 100 g | 213 g |
| Calcium carbonate | 350 g | 350 g |
| Water | — | 63.6 g |

*an anionically stabilized aqueous dispersion of a styrene/butadiene copolymer.

The Brookfield viscosity of the foregoing formulation at room temperature using a No. 5 spindle at 20 rpm is increased to 10,000 cps by adding sodium polyacrylate thickener.

This formulation has improved electroconductive properties and can be stored for a period of more than three months without coagulating.

What is claimed is:

1. A shelf-stable latex composition suitable as a backing material for textiles wherein the composition comprises an anionically stabilized latex of a thermoplastic, organic polymer, a filler, a thickener for the latex, and a quaternized epihalohydrin polymer having a molecular weight in the range from about 120 to about 200,000 and a degree of quaternization in the range from about 50 to 100 mole percent in an amount sufficient to measurably reduce the volume resistivity of said composition.

2. The composition of claim 1 wherein the quaternized epihalohydrin polymer is polyepichlorohydrin quaternized with trialkylamine wherein alkyl has one or two carbon atoms, said quaternized polyepichlorohydrin having a molecular weight in the range from about 120 to about 2000.

3. The composition of claim 1 wherein the quaternized epihalohydrin polymer has a molecular weight in the range from about 2000 to about 200,000 and the composition contains from about 0.5 to about 20 dry weight parts of a water-soluble salt based on the 100 dry weight parts of latex polymer solids.

4. The composition of claim 2 wherein the salt is sodium chloride.

5. The composition of claim 1 wherein the composition comprises on a dry basis from about 20 to about 35 weight percent of latex polymer solids, from about 62 to 79 weight percent of filler, from about 1 to about 3 weight percent of quaternized polyepihalohydrin and an amount of thickener effective to provide a Brookfield viscosity in the range from about 6,000 to about 15,000 centipoise at ambient temperature using a No. 5 spindle at 20 rpm.

6. The composition of claim 1 wherein the quaternized epihalohydrin polymer is represented by the formula

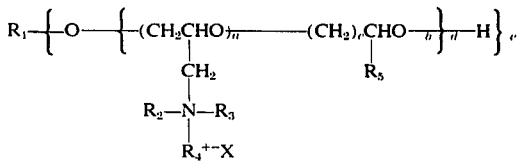

wherein $R_1$ is hydrogen or the residue of an active hydrogen organic initiator selected from the group consisting of aliphatic monohydric and polyhydric alcohols, alcohol ethers, hydroxy terminated polyethers and monohydric and polyhydric phenols; $R_2$, $R_3$ and $R_4$ are individually methyl, ethyl and hydroxyethyl; $R_5$ is hydrogen, alkyl, haloalkyl or aminoalkyl; $a$ is an integer from 1 to 2000; $b$ is an integer from 0 to 1000; $c$ is an integer from 1 to 4; $d$ is an integer from 1 to 2000 and $e$ is an integer from 1 to 8.

7. The composition of claim 6 wherein each of $R_2$, $R_3$ and $R_4$ are methyl.

8. The composition of claim 1 wherein the filler is calcium carbonate and the thickener is sodium polyacrylate.

9. The composition of claim 1 wherein the composition is applied as a backing to a textile fabric.

10. The composition of claim 1 wherein the composition is applied as a backing to carpet.

* * * * *

UNITED STATES PATENT AND TRADEMARK OFFICE
CERTIFICATE OF CORRECTION

PATENT NO. : 3,898,185
DATED : August 5, 1975
INVENTOR(S) : Dennis H. Philp et al.

It is certified that error appears in the above-identified patent and that said Letters Patent are hereby corrected as shown below:

Column 1, line 15, delete "manufactue" and insert --manufacture--.

Column 1, line 46, delete "Unfortuntely" and insert --Unfortunately--.

Column 2, line 35, delete the number "40" and insert the number --50--.

Column 5, line 41, delete the word "preferably" and insert --preferable--.

Column 7, line 19, delete "volume" and insert --Volume--.

Column 7, line 39, delete "voltge" and insert --voltage--.

Signed and Sealed this second Day of March 1976

[SEAL]

Attest:

RUTH C. MASON
*Attesting Officer*

C. MARSHALL DANN
*Commissioner of Patents and Trademarks*